(12) United States Patent  
Kappelgaard et al.

(10) Patent No.: US 7,212,884 B2
(45) Date of Patent: May 1, 2007

(54) NETWORK CONTROLLED SORTER CONVEYOR

(75) Inventors: Søren Kappelgaard, Århus (DK); Henrik Andersen, Hornslet (DK); Jakob Holm-Petersen, Lystrup (DK)

(73) Assignee: FKI Logistex A/S, Arhus N (DE)

( * ) Notice: Subject to any disclaimer, the term of this patent is extended or adjusted under 35 U.S.C. 154(b) by 0 days.

(21) Appl. No.: 10/498,541

(22) PCT Filed: Dec. 11, 2002

(86) PCT No.: PCT/DK02/00844

§ 371 (c)(1),
(2), (4) Date: Mar. 18, 2005

(87) PCT Pub. No.: WO03/050021

PCT Pub. Date: Jun. 19, 2003

(65) Prior Publication Data

US 2005/0159837 A1    Jul. 21, 2005

(30) Foreign Application Priority Data

Dec. 11, 2001   (DK)   ................................ 2001 01853

(51) Int. Cl.
G06F 7/00  (2006.01)
(52) U.S. Cl. .................. 700/228; 700/230; 198/349; 198/349.5; 198/349.6; 198/370.04
(58) Field of Classification Search ........ 700/228–230, 700/112; 198/349, 349.5, 349.6, 370.04
See application file for complete search history.

(56) References Cited

U.S. PATENT DOCUMENTS 5,018,928 A * 5/1991 Hartlepp .................... 414/339
5,676,514 A   10/1997 Gould et al.
6,089,512 A    7/2000 Ansorge et al.
6,711,462 B2 * 3/2004 Flores et al. ............... 700/223
6,762,382 B1 * 7/2004 Danelski .................... 209/583
6,799,672 B2 * 10/2004 Wood .................... 198/370.04

FOREIGN PATENT DOCUMENTS

EP    0 540 464 A2    5/1993

(Continued)

OTHER PUBLICATIONS

International Search Report of PCT/DK02/00844.

*Primary Examiner*—Khoi H. Tran
(74) *Attorney, Agent, or Firm*—Foley & Lardner LLP

(57) ABSTRACT

The present invention relates to a sorter conveyor having a plurality of conveyor units with article-supporting means, such as tilt trays or cross-belts, equipped with discharge means for discharging articles conveyed on the article-supporting means, which discharge means are driven by means, typically electric motors, controlled from the moving part of the conveyor. The control signals for controlling the operation of each of the discharge means are communicated by means of a common data communication network situated on the moving part of the conveyor so that control signals for each of the discharge means may be communicated to the moving part of the conveyor from one stationary position along the path of the conveyor. The invention further relates to a method of controlling the operation of such sorter conveyor.

14 Claims, 3 Drawing Sheets

FOREIGN PATENT DOCUMENTS

| | | |
|---|---|---|
| EP | 0 700 844 A2 | 3/1996 |
| EP | 0 811 567 B1 | 8/1999 |
| WO | WO 96/31381 A1 | 10/1996 |
| WO | WO 00/32502 A1 | 6/2000 |
| WO | WO 00/71446 A1 | 11/2000 |
| WO | WO 01/60674 A1 | 8/2001 |
| WO | WO 02/24557 A1 | 3/2002 |

* cited by examiner

NETWORK CONTROLLED SORTER CONVEYOR

The present invention relates to a sorter conveyor having a plurality of conveyor units with article-supporting means, such as tilt trays or cross-belts, equipped with discharge means for discharging articles conveyed on the article-supporting means, which discharge means are driven by means, typically electric motors, controlled from the moving part of the conveyor. The control signals for controlling the operation of each of the discharge means are communicated by means of a common data communication network situated on the moving part of the conveyor so that control signals for each of the discharge means may be communicated to the moving part of the conveyor from one stationary position along the path of the conveyor.

The invention further relates to a method of controlling the operation of such sorter conveyor.

BACKGROUND

Sorter conveyors with an endless chain of linked conveyor units each having discharge means driven and controlled from the conveyor unit are well-known in the prior art. The discharge means are powered from the stationary part of the conveyor by means of conductor rails and collector shoes on the moving part of the conveyor, by means of electric generators driven by wheels on the conveyor units running on stationary tracks or by an inductive energy transfer system.

The discharge means are commonly controlled by means of control units on the conveyor units, controlling the discharge means of one or a few adjacent conveyor units. The control signals for controlling discharge of articles or other operations, such as moving of cross-belts during induction of articles, tilt of trays in curves to counteract the apparent centrifugal force or at induction stations to catch articles, etc., are transmitted to the control units by means of stationary data transmission means arranged along the conveying path of the conveyor immediately before each of the discharge stations, induction stations, curves, etc.

The individually controllable discharge means offer many advantages but have also some drawbacks. The plurality of stationary data transmission means require an extensive installation operation including wiring from a central control unit to each of the data transmission means and maintenance and readjustment operation is also labour intensive.

An alternative solution is described in the international patent application WO 96/31381 and the related U.S. Pat. No. 6,089,512 disclosing a conveyor system in which data are transmitted to each transport element via a transmission head that continuously is in data transmission contact with a stationary line or the like disposed along the entire path of the conveyor. This solution has the same drawbacks as the above described system.

BRIEF DESCRIPTION OF THE DRAWINGS

The following is a brief description of the figures depicting various embodiments of the present invention.

DESCRIPTION OF THE INVENTION

Thus, it is an object of the present invention to remedy the above drawbacks by providing an improved sorter conveyor as well as a method of controlling the operation of such sorter conveyor.

This is achieved by the sorter conveyor of the present invention which comprises a data communication network on the moving part of the conveyor by means of which the operation of each of the discharge means of the sorter conveyor may be controlled so that control data are communicated from stationary data transmission means to the network and via the network to the discharge means. Thereby it is achieved that the request for stationary data transmission means at each position where the discharge means are operated is made superfluous and a more simple control system is provided, which in a preferred embodiment requires only one stationary data transmission means along the conveyance path of the sorter conveyor is required. The installation operation is thus simplified and adjustment and readjustment of the operational parameters of the system is facilitated.

It is furthermore achieved that real-time control of the sorter conveyor is facilitated as the response time limitations of the field bus connecting the plurality of stationary data transmission means used in the known sorter conveyor are overcome. Other advantages will be apparent from the description below.

Figure 1:
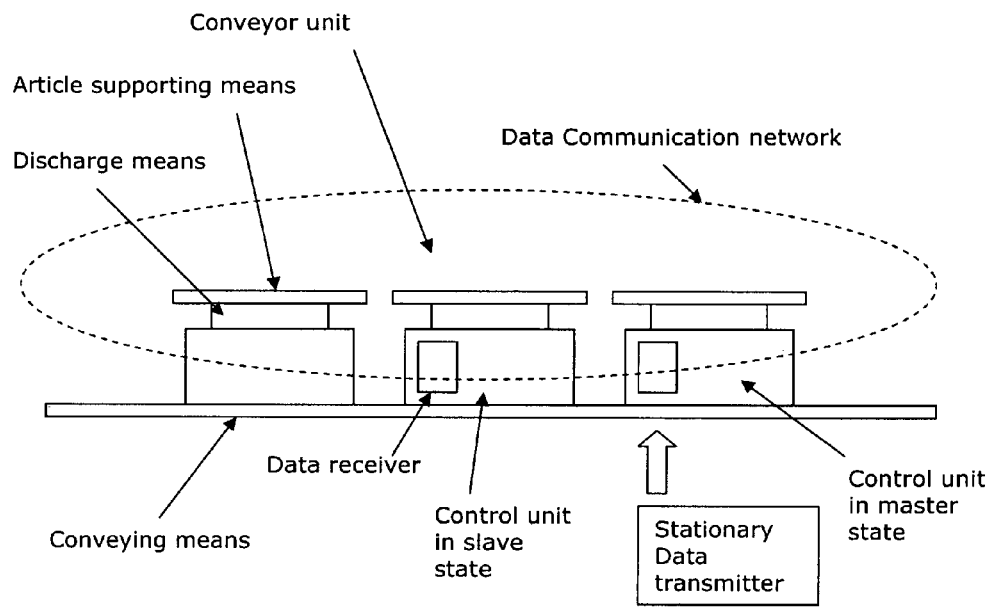
FIG. 1 is a schematic view of the sorter conveyor according to one embodiment of the present invention.

As shown in FIG. 1, an embodiment of the present invention relates to a sorter conveyor comprising:

a plurality of conveyor units each having article-supporting means, such as tilt trays or cross-belts, and a discharge means for discharging articles therefrom, a data communication network by means of which the operation of each of the plurality of discharge means may be controlled, a data receiving means connected to the data communication network and adapted to receive control data for controlling the operation of the discharge means, a conveying means for conveying the plurality of conveyor units and the data communication network as well as the data receiving means along a track part of the sorter conveyor, and a stationary data transmission means adapted to transmit control data to the data receiving means.

The data communication network is preferably a point-to-point network in which the data are sent from node to node, e.g. comprised by local control units, but it may as well be other network types such as a field bus network or a star network. In case of the data network being a point-to-point network, each conveyor unit is preferably provided with or connected to a separate control unit. In a preferred embodiment, all conveyor units of the conveyor are substantially identical in the sense that they are provided with substantially identical discharge means and with respective control units providing substantially identical control of the discharge means. This allows for easy exchange of, e.g. an inoperable conveyor unit, as such exchange in preferred embodiments can be provided without any modification of mechanical components or control system components.

Figure 3:
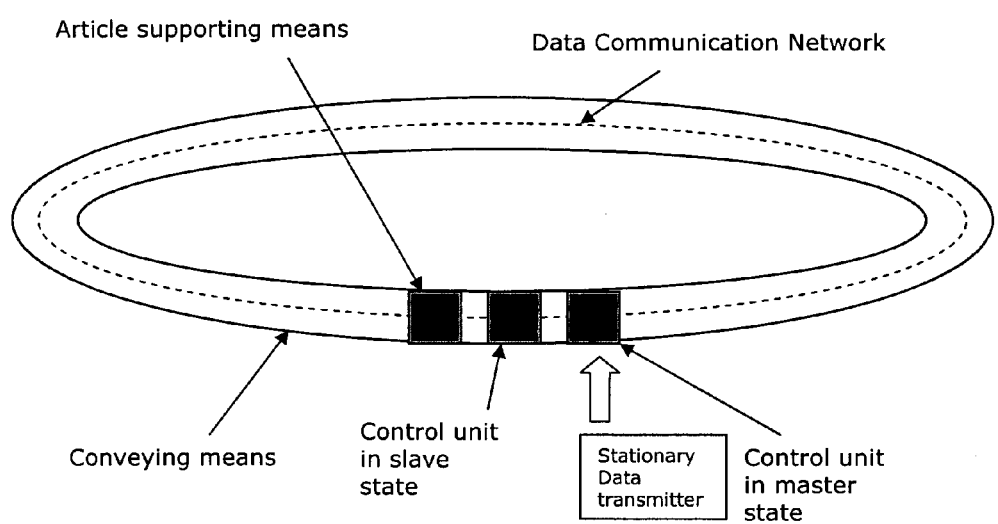
FIG. 3 is a schematic view of the sorter conveyor according to an embodiment of the present invention.

As shown in FIG. 3, the sorter conveyor may be a closed-loop conveyor in which a train of conveyor units form a closed or endless loop, the conveyor units being driven along a closed loop track. The sorter conveyor may comprise discharge means of the form of tiltable trays known per se from, e.g. WO 00/71446 which is hereby incorporated by reference or EP 0 540 464, or cross-belt units known per se from, e.g. EP 0 700 844 or WO 00/32502.

Accordingly, the discharge means may be operated to discharge articles from the article-supporting means but may in preferred embodiments also be used for other operations, such as moving of cross-belts during induction of articles, tilt of trays in curves to counteract the apparent centrifugal force or at induction stations to catch articles, etc.

The stationary data transmission means are connected to a central control unit and comprise in a preferred embodiment only one data transmission means arranged along the path of the conveyor. However, more transmission means may be arranged to shorten the response time between the input of control data and the operation of the given discharge means. According to a preferred embodiment the data transmission means is arranged to be in transmitting engagement with two consecutive data receiving means, typically arranged on the control units of consecutive discharge means so that there is a back-up for the malfunction of one data receiving means.

The conveyor units are moved along a stationary track part of the conveyor by drive means, such as linear motor drive or a drive chain. The conveyor units may be separate trolleys pivotally connected to form an endless chain, each trolley carrying one or more article-supporting means and associated discharge means.

The operation of the individual discharge means may be fully controlled by means of the network, but the sorter conveyor comprises in a preferred embodiment a plurality of control units conveyed by means of the conveying means and adapted to control the operation of the discharge means of the plurality of conveyor units, so that each discharge means is connected to a control unit, wherein each of the plurality of control units are connected to the data communication network which is adapted for transmitting control data to each of the control units. In a particularly preferred embodiment, each discharge means has a separate control means controlling the operation of that discharge means only.

A suitable arrangement is when each control unit comprises a data receiving means for receiving data from the stationary transmission means. According to one configuration, the control units are adapted to be in a master state for receiving data by means of the receiving means and for distributing said data by the network when their data receiving means are in a data transmission position with the data transmission means, and to be in a slave state for receiving data by the network only in other positions. The control unit in the slave state may also transmit data to a stationary receiver if data transmission means are arranged on the conveyor means as discussed below.

The data transmission may be performed via a conductor rail and collecting shoes, that e.g. also is used for power supply to the discharge means, but the sorter conveyor preferably comprises stationary data transmission means that are adapted for wireless data transmission. The stationary data transmission means employs according to one embodiment light for data transmission, in particular infrared light. In another embodiment, a magnetic field is employed for data transmission and the data transmission means may in particular be integrated in an inductive energy transfer system by overlaying the energy transmission frequency with a data carrying frequency. Also, radio waves may be used for the data transmission. Embodiments incorporating data transmission by means of light, such as infrared light, may for certain applications be preferred, such as for applications in which goods sensitive to radio waves or magnetic fields are transported by the sorter conveyor.

The article-supporting means of at least some of the plurality of conveyor units may comprise a tray that may be tilted perpendicularly to a direction of conveyance of the conveyor unit by means of the discharge means. Alternatively or additionally, the article-supporting means of at least some of the plurality of conveyor units may comprise an endless belt, so-called cross-belt, that may be moved perpendicularly to a direction of conveyance of the conveyor unit by means of the discharge means. According to a preferred embodiment, the sorter conveyor comprises tilt trays as well as cross-belts for supporting the articles and the system and the method of the present invention are particularly suited for controlling such mixed sorter conveyor.

It is advantageous that the data communication network and the stationary data transmitting means are adapted for real-time transmission of control data to the plurality of control units.

Figure 2:
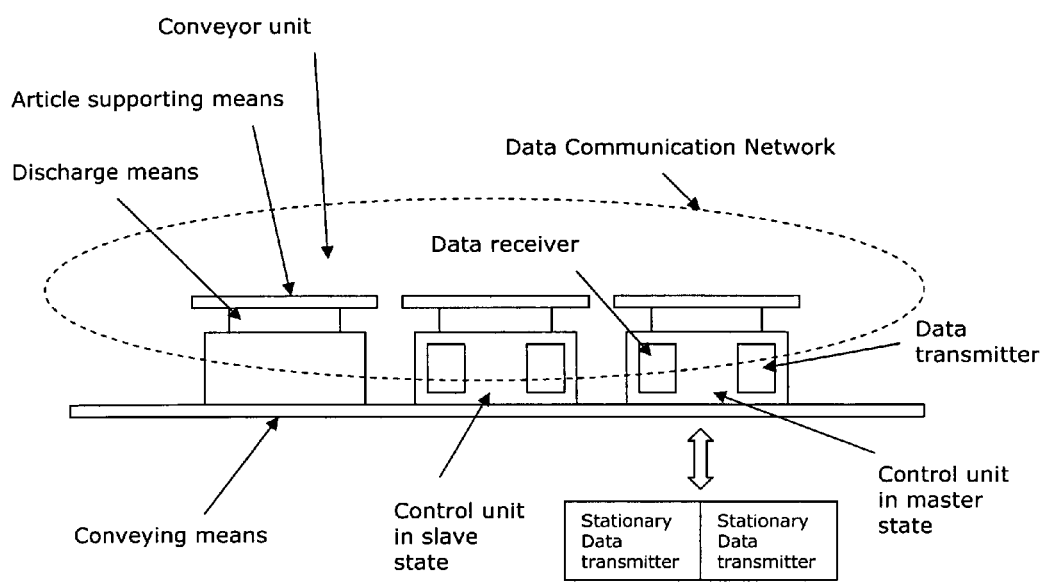
FIG. 2 is a schematic view of the sorter conveyor according to another embodiment of the present invention.

As seen in FIG. 2, the conveying means may further convey data transmission means, and the sorter conveyor further comprises a stationary data receiving means for receiving data from said data transmission means. By means of said data transmission means on the moving part of the conveyor, data relating to the status of the sorter conveyor may be transmitted to a central control unit for surveillance of the sorter conveyor. Said data transmission means may be connected to the data transmission network such that status data and other data relating to the operation for each of the discharge means and optionally other parts of the sorter conveyor may be transferred on-line to one stationary data receiving means.

The present invention further relates to a method of controlling the operation of a sorter conveyor comprising a plurality of article-supporting means having discharge means for discharging articles, the method comprising the steps of transmitting control data from a stationary data transmitter to a data communication network on a moving part of the sorter conveyor by means of which the operation of each of the plurality of discharge means on the sorter conveyor may be controlled, and controlling the operation of said discharge means according to said control data.

The transmission of control data is preferably performed by wireless transmission means.

The control data may comprise the position or time to begin an operation of a given discharge means. The position of the article-supporting means may be communicated via the data transmission means or alternatively, the position may be detected on-board the moving part of the sorter conveyor e.g. by the output from a photo electric detector passing a dedicated light source. If the time is communicated to the network, the position of the sorter must be detected and communicated to the central control unit controlling the data transmission means in order to co-ordinate the discharge operations and the position of the discharge stations.

Furthermore, the control data may comprise instructions to the course of a given operation of a discharge means, i.e. the speed of the cross-belt, the angular speed of the tilt tray etc. so that the operation may be controlled and adjusted e.g. for physical characteristic of the article to be handled, such as weight, weight distribution, and/or frictional properties of the surface.

Preferably, the control of the discharge means by means of the control data from the stationary data transmitter is performed in real-time.

The invention claimed is:

1. A sorter conveyor comprising:
   a plurality of conveyor units each having article-supporting means and discharge means for discharging articles therefrom,
   a data communication network adapted to control the plurality of discharge means,
   wherein each of a plurality of conveyor units with a control unit comprises a data receiver connected to the data communication network and adapted to receive control data for controlling the operation of the discharge means,
   a conveying means for conveying the plurality of conveyor units, the data communication network, and the plurality of data receivers along a track part of the sorter conveyor,
   a stationary data transmitter adapted to transmit control data to the data receivers, and
   the plurality of control units adapted to be conveyed by means of the conveying means and adapted to control the operation of the discharge means of the plurality of conveyor units, so that each discharge means is connected to a control unit, each of the plurality of control units being connected to the data communication network which is adapted for transmitting the control data to each of the control units
   wherein the control units are adapted to be in a master state for receiving data by means of the data receivers and for distributing said received data to the network when their data receivers are in a data transmission position with the stationary data transmitter, and to be in a slave state for receiving data from the network only when their data receivers are not in a data transmission position with the stationary data transmitter.

2. A sorter conveyor according to claim 1, wherein the stationary data transmitter is adapted for wireless data transmission.

3. A sorter conveyor according to claim 2, wherein the stationary data transmitter employs light for data transmission.

4. A sorter conveyor according to claim 3, wherein the stationary data transmitter employs infrared light for data transmission.

5. A sorter conveyor according to claim 1, wherein the article-supporting means of at least two of the plurality of conveyor units comprise a tray that may be tilted perpendicularly to a direction of conveyance of the conveyor unit by means of the discharge means.

6. A sorter conveyor according to claim 1, wherein the article-supporting means of at least two of the plurality of conveyor units comprise an endless belt that is moved perpendicularly to a direction of conveyance of the conveyor unit by means of the discharge means.

7. A sorter conveyor according to claim 1, wherein the data communication network and the stationary data transmitter is adapted for real-time transmission of control data to the plurality of control units.

8. A sorter conveyor according to claim 1, wherein the conveying means further convey a data transmitter, and the sorter conveyor further comprises a stationary data receiver for receiving data from the data transmitter conveyed by the conveying means.

9. A method of controlling the operation of a sorter conveyor comprising a plurality of article-supporting means having discharge means for discharging articles, the method comprising the steps of:
   transmitting control data from a stationary data transmitter to a data communication network on a moving part of the sorter conveyor by means of which the operation of each of the plurality of discharge means on the sorter conveyor may be controlled,
   transmitting control data from the data communication network to each of a plurality of control units, the control units being conveyed by means of a conveying means, each control unit comprising a data receiver, and each discharge means being connected to a control unit, and
   controlling the operation of said discharge means according to said control data and by means of the control units,
   wherein the control units are adapted to be in a master state for receiving data by means of the data receivers and for distributing said received data to the network when their data receivers are in a data transmission position with the stationary data transmitter, and to be in a slave state for receiving data by the network only when their data receivers are not in a data transmission position with the stationary data transmitter.

10. A method according to claim 9, wherein said transmitting of control data is performed by a wireless transmission transmitter.

11. A method according to claim 9, wherein the control data comprise a position or time to begin an operation of a given discharge means.

12. A method according to claim 9, wherein the control data comprise instructions to a course of a given operation of a discharge means.

13. A method according to claim 9, wherein the control data comprise an indication of the position of the article-supporting means.

14. A method according to claim 9, wherein the control of the discharge means by means of the control data from the stationary data transmitter is performed in real-time.

* * * * *